United States Patent [19]
Bodovsky

[11] Patent Number: 5,181,945
[45] Date of Patent: Jan. 26, 1993

[54] HIGH-TEMPERATURE FABRIC FILTER MEDIA

[75] Inventor: Paul W. Bodovsky, Sherman, Tex.

[73] Assignee: Continental Conveyor & Equipment Co., Winfield, Ala.

[21] Appl. No.: 712,446

[22] Filed: Jun. 10, 1991

[51] Int. Cl.⁵ .............................................. B01D 46/38
[52] U.S. Cl. ......................................... 55/290; 55/351; 55/400; 55/477; 55/528; 55/DIG. 43; 55/DIG. 44; 210/499
[58] Field of Search ................. 55/290, 381, 351, 283, 55/400, 477, DIG. 43, DIG. 44, 528; 210/499; 66/194, 190, 191

[56] References Cited

U.S. PATENT DOCUMENTS

| | | | |
|---|---|---|---|
| 3,083,515 | 4/1963 | Morris et al. | 55/290 |
| 3,154,934 | 11/1964 | Frishman | 66/194 |
| 3,977,847 | 8/1976 | Clark | 55/DIG. 44 |
| 4,284,507 | 8/1981 | Beane | 55/477 |
| 4,289,510 | 9/1981 | Herndon, Jr. | 55/DIG. 43 |
| 4,336,035 | 6/1982 | Evensted et al. | 55/381 |
| 4,536,439 | 8/1985 | Forsten | 55/528 |
| 4,840,838 | 6/1989 | Wyss | 55/528 |

OTHER PUBLICATIONS

Intravac Technical Data Brochure from Continental Air Systems, Copyright 1984.
Outravac Technical Data Brochure from Continental Air Systems, Copyright 1989.
Ryton Technical Data Leaflet from Phillips Fibers Corporation, Dated Apr. 1990.
House Insurance Technical Data Leaflet from Phillips Fibers Corporation, undated.

Primary Examiner—Bernard Nozick
Attorney, Agent, or Firm—Pearne, Gordon, McCoy & Granger

[57] ABSTRACT

An efficient, highly porous fabric filter medium capable of filtering air at temperatures up to about 500° F. (260° C.) has been provided. The filter medium is made from a polyimide fiber and is especially well suited for use in combination with a rotating drum filtering machine, thereby providing high temperature air filtration at a lower initial equipment and installation cost, and with subsequent lower operating and maintenance costs than have been previously possible.

10 Claims, 2 Drawing Sheets

HIGH-TEMPERATURE FABRIC FILTER MEDIA

BACKGROUND OF THE INVENTION

This invention relates to fabric filter media having a knitted backing with a pile fiber face on one side and, more specifically, to such fabric media which are suitable for prolonged continuous high temperature use in combination with a rotating drum air filtration machine.

DESCRIPTION OF RELATED ART

The accepted method for dry filtering large quantities of air or other gases which are at temperatures in excess of about 250° F. involves the use of woven or felted fabric bag filters mounted on a tubular wire mesh frame and enclosed inside of a large metal structure which is commonly referred to as a bag house. The bag house has a tapered hopper and screw conveyor beneath it to collect and discharge the filtered particles. Dirt-laden air contacts the outside of the bag and passes through the bag fabric while particles are collected on the outside surface of the bag. The clean air exits through the top of the bag and passes into a clean air plenum or manifold above the bag house from which the air is discharged or recirculated. Dirt particles which accumulate on the outside of the bag are knocked loose by intermittent or periodic blasts of high pressure air from the inside of the bag. The particles fall to the bottom of the bag house onto the screw conveyor which discharges the particles from the bag house. The air blasts are sequenced to clean only a few of the bags at one time in order to conserve on compressed air requirements. The average pressure drop across the bag filter is maintained at a level which is intended to strike a balance between minimizing air compressor and blower fan horsepower requirements, while minimizing the number of bag filters and the size of the bag house. Because of the low permeability of the woven or felted fabrics of bag house filters, the optimal pressure drop generally results in an air handling capacity of about 10 cubic feet per minute per square foot of bag capacity. This low permeability and low air handling capacity, relative to that of, for example, rotating drum filtering machines, results in higher initial installation and equipment costs, as well as higher operating and maintenance costs.

While the desirability of using rotating drum filtering machines for applications currently employing bag house filters is apparent, efficient economical designs for continuously filtering high temperature air using fabric drum filtering machines have not been developed. The fur-type filtering media previously used with drum filtering machines have been fabricated from acrylic and polyester materials having a maximum operating temperature of about 250° F. (120° C.), and are, consequently, not suitable for continuous use at high temperatures.

The fabric used in bag house filters, while capable of continuous operation at high temperatures, is not suitable for use with drum filtering machines. Drum filtering machines operate by passing the air through the filter, collecting the particles on the filter media, and then renewing the filter media by vacuuming substantially all of the particles from the filter media. While fur-like fabrics made from knitted acrylic or polyester are easily vacuumed, the woven and felted fabrics used to make bag house filters tend to trap dirt more tightly and would rapidly accumulate dirt which cannot be removed by vacuuming. This accumulated dirt would cause the already low permeability of the woven or felted fabrics to become even less permeable, requiring larger equipment and higher energy expenditures for operating the blower fan.

Accordingly, it would be desirable to provide filter media suitable for use with a drum filtering machine, and which is capable of prolonged continuous operation at temperatures up to about 500° F. (260° C.).

SUMMARY OF THE INVENTION

The present invention relates to a filtering device having a fabric filtering medium suitable for prolonged continuous use at temperatures as high as about 500° F. (260° C.). The filtering medium can be easily vacuumed clean, yet provide an effective multilayered barrier to trap airborne particles. This novel fabric filtering medium is particularly well-suited for use with rotating drum filtering machines and provides an attractive, more economical alternative to the equipment which has previously been used for filtering high temperature air.

The filter medium is made from a flexible polymeric fiber rated for continuous use at temperatures up to about 500° F. (260° C.). The fiber has knittable qualities and is resistant to deterioration in an abrasive environment. The fiber is spun into a denier yarn, which is then knitted into a backing. Loose fibers are then mechanically interlocked into the knitted backing to form a tufted pile. The pile is typically trimmed to a length of about 2 centimeters. A high temperature stabilizing agent can be applied to the fabric to retard stretching and shrinking.

The resulting fur-like fabric is capable of efficiently filtering dirt particles from high temperature air at a rate of about 60 to 80 cubic feet per minute per square foot of filter media at a pressure drop of less than 1.5 inch water gauge, thereby providing a high filtration rate per unit of fabric area with low blower fan power requirements.

During use, contaminant-laden air is blown through the fabric from the pile side. The air blowing against the filter media causes the pile fibers to lie down, thereby providing a multilayered barrier which efficiently traps particles yet allows air to pass freely through. The filter media are easily fully regenerated by vacuuming, which causes the fibers to stand up substantially perpendicular to the backing, permitting particles to be cleaned from between the fibers and from the backing.

The invention facilitates the use of rotating drum filtering machines for removing dirt and particles from high temperature air, and is therefore of great benefit and value to industries which have been required to rely on less efficient, more expensive means.

DETAILED DESCRIPTION OF THE PREFERRED EMBODIMENT

Figure 1:
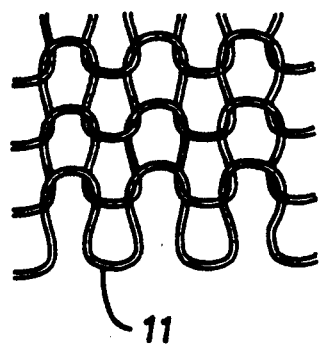
FIG. 1 is a schematic view showing strands of yarn knitted into a weft knit jersey pattern to form a knitted backing in accordance with the preferred embodiment of the invention.
Figure 2:
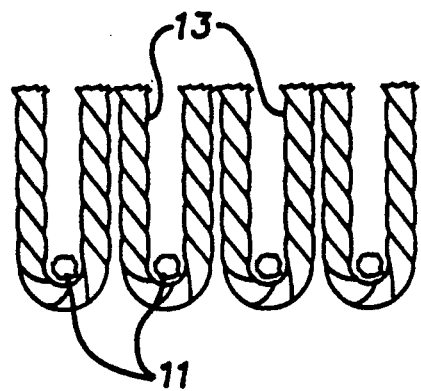
FIG. 2 is a cross-sectional, schematic view showing strands of fiber which have been mechanically interlaced into the knitted backing.

A fabric filter medium capable of prolonged continuous use at temperatures up to about 500° F. (260° C.) is made entirely from a fiber rated for such high-temperature use by spinning the fiber into a denier yarn, knitting the yarn into a backing, and mechanically interlocking loose fibers into the backing to form a tufted pile. In accordance with the preferred embodiment, a 360-denier yarn 11 is knitted into a weft knit jersey pattern as shown in FIG. 1. The knitted backing is preferably loose and relatively porous. Other knitted backings consistent with the scope and spirit of the invention are possible and will be apparent to those skilled in the art. Loose fibers 13 of the same material which are rated for high-temperature applications are mechanically interlaced to the backing to form a carpetlike tufted pile fabric as shown in FIG. 2. The pile is preferably of 3-denier crimped fibers. The pile is preferably trimmed to a length of about 2 centimeters. The total weight of the medium is about 1.6 ounces per square foot, with a ratio of about 80% pile weight and 20% backing weight. A high-temperature stabilizing agent may be applied to retard stretching and shrinking.

Fibers which are suitable for use in accordance with the invention should, in addition to being resistant to decomposition and deterioration at high temperatures, also have knittable qualities and be resistant to deterioration in an abrasive environment. The fibers should also be capable of being flexed without breaking. Aromatic polyimide fibers such as those obtainable from Lenzing AG, Lenzing, Austria, under their trademark LENZING P84, or "RYTON" polyphenylene sulfide fiber available from Phillips Fiber Corporation, have been found to be suitable for use with the invention. Aromatic aramid fibers are also suitable for producing a filter medium in accordance with the invention. Conventional techniques of knitting and manufacturing carpetlike fabrics can be used for producing high-temperature resistant filter media from aromatic polyimide fibers, aromatic aramid fibers, or from other fibers having the described desirable characteristics.

Figure 3:
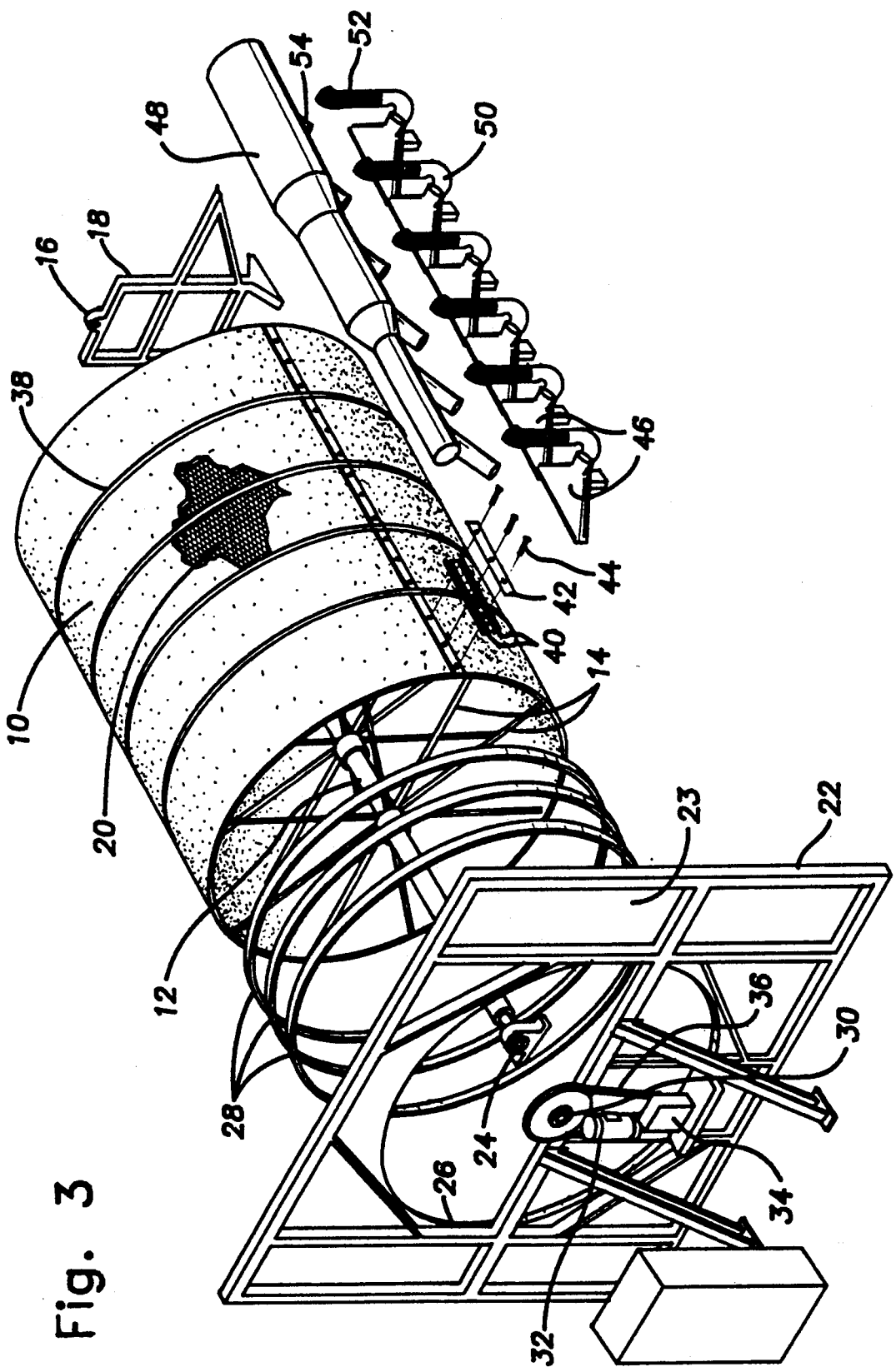
FIG. 3 is an exploded perspective view of a fabric drum filtering machine.

The present invention can be advantageously used in combination with fabric drum filtering machines for dry filtration of dirt from hot air or other gases. FIG. 3 shows a fabric drum filtering machine using the filter media described herein. The filtering machine has a horizontally oriented cylindrical drum 10 which has a shaft 12 rigidly connected to the drum, by means of a plurality of supporting spokes 14, so that the longitudinal axis of the shaft coincides with that of the drum. One end of the drum has a solid wall (not shown) with an opening at the center from which a journalled portion of the shaft extends into a bearing 16 mounted to a structural support frame 18. The drum 10 is made from expanded metal or is otherwise provided with an array of perforations or openings 20 which permit free flow of air through the wall. The other end of the drum is open and extends to a frame 22. The front end of the shaft is journalled to a thrust bearing 24 which is mounted to the frame 22. The two bearings 16 and 24 combine to horizontally support the shaft 12 and the drum 10 for rotational motion about the longitudinal axis of the shaft. The frame 22 which attaches to the front opening of the drum has a solid wall 23 with a circular opening 26 having a diameter equal in size to that of the drum. The opening of the drum is sealingly fitted to the opening 26 in the wall of frame 22 via drum sealing rings 28. A sprocket 30 is splined or otherwise fixedly connected to the front end of the shaft 12 from the side of frame 22 opposite that of the drum. The output shaft of a motor 32 is linked to a gear box 34 which translates power from the motor to a drive chain 36 which engages the sprocket 30 to drive the shaft 12, and hence the drum 10. A fabric filtering medium capable of enduring long-term exposure to high temperatures is fixed to the entire circumferential wall of the drum 10, with the pile side facing out from the drum. The medium is held in place by clamping bands 38 which circumferentially strap the filter media to the drum, and by zipper tracks 40 and cover plates 42 which hold the ends of the filter media to the drum 10 along its length. The cover plates 42 are fastened to the drum wall by screws 44.

A row of vacuum nozzles 46 is supported along the side of the drum with the nozzle openings abutting the filter medium. Each nozzle communicates with a suction manifold 48 via an elbow 50 and a flexible conduit 52. Each conduit is connected to the manifold at a 45-degree lateral entry tube 54. The suction manifold is in communication with a vacuum pump 66 or other vacuum source.

Figure 4:
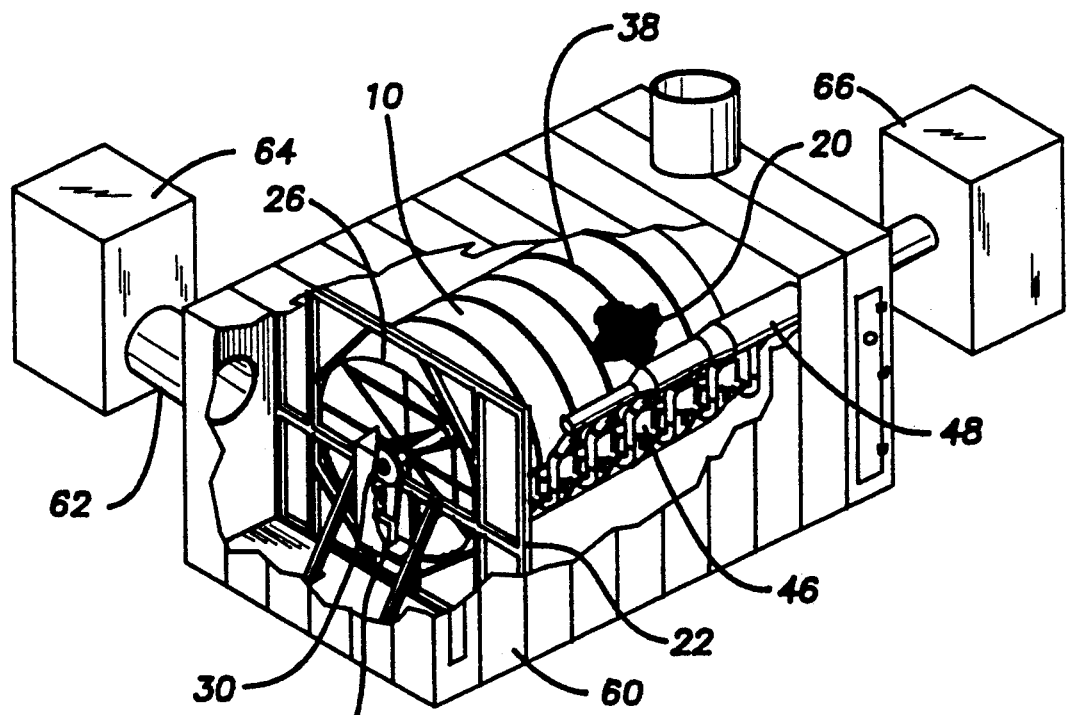
FIG. 4 is a perspective view of the assembled machine shown in FIG. 3, and also including the discharge enclosure and the outlet duct.

Referring to FIG. 4, a box-shaped discharge enclosure 60, with the front frame 22 and wall 24 constituting one side of the enclosure, completely surrounds the open end of the drum. A wall of the discharge enclosure is provided with a circular duct outlet 62 from which filtered air is discharged.

The outlet 62 is in communication with a blower fan 64 which pulls air from the surrounding environment through the filter media into the drum, then into the enclosure 60, and finally through the outlet 62. As air is drawn through the filter media, it causes the pile to lie down like stroked animal fur. When the pile fibers lie down, they provide a multilayered barrier to trap airborne particles on the surface while permitting air to freely pass through the media. The filter media of the invention have an air flow rating of about 50 to 80 cubic feet of air per minute per square foot of filter media with a pressure drop of less than 0.05 inch w.g. when clean to 1.5 inch w.g. when dirty, thus permitting efficient filtering of hot air, at temperatures up to about 500° F. (260° C.), using equipment having a lower initial and operating cost than was previously possible.

The blower fan is operated continuously when air filtration is required, while the vacuum pump connected to the suction manifold 48 and the motor 32 are only intermittently operated to maintain a predetermined range of pressure drop across the filter media. The pressures both inside and outside of the drum are transmitted from pressure sensors to a control which operates the motor to cause the drum to rotate, and turns on the vacuum pump when the pressure differential between the inside and outside of the drum exceeds a predetermined value. As the drum rotates, the vacuuming nozzles remove collected dirt particles from the filter media, which causes the differential pressure to drop. When the pressure differential reaches a second lower predetermined value, the controller turns off the motor 32 and the vacuum pump. During the vacuuming operation, the pile fibers which normally lie down during filtering are stood up perpendicular to the drum surface by the nozzle suction which allows substantially all of the collected dirt particles filtered from the air to be cleaned from the media surface, from between fibers, and from the knitted backing. This cleaning process and filter medium design allows the filter medium to be substantially restored to its initial condition.

It is to be understood that while the advantages of the disclosed filter media used in combination with a rotating drum air filtration machine wherein dirt-laden air is drawn through filer media retained on the outer cylindrical surface of the drum and clean air exits from an end of the drum, have been described in detail, the scope of the invention extends equally to rotating drum air filtration machines wherein dirt-laden air is drawn in through the end of the drum and exits through the cylindrical surface, to rotating drum air filtration machines wherein the filter media is retained on the inner cylindrical surface of the drum, and to other equivalent embodiments which would be obvious to those skilled in the pertinent art.

The high temperature filter media of the invention, when used in combination with a fabric drum filtering machine, provide many industries, such as the fiberglass, ceramic, electric utility, and waste incineration industries, with a less expensive alternative to bag house filtration for filtering great volumes of air which are at temperatures as high as about 500° F. (260° C.).

While what is presently considered to be the most practical and preferred embodiment of the invention has been described, it is to be understood that the invention is not to be limited to the disclosed embodiment but, to the contrary, is intended to cover various modifications and equivalent arrangements included within the spirit and scope of the appended claims.

What is claimed is:

1. In an air filtering machine, including a base, a drum having a cylindrical sidewall, said drum being open at one end and being closed at its other end by an end wall and having an array of perforations through its sidewall, said drum being mounted on said base for rotation about its longitudinal axis, an enclosure which encases at least the open end of said drum, an air outlet defined by said enclosure, means defining at least one vacuum nozzle opening facing the sidewall of said drum, conduit means for providing communication between said nozzle and a suction source, drive means for rotating said drum, a fabric filtering medium removably disposed over the sidewall of said drum, and means for creating a pressure differential across said filter, in combination therewith, the improvement comprising:

said fabric filtering medium consisting essentially of a polyimide fiber which is suitable for prolonged continuous use at temperatures up to about 500° F. (260° C.), and having a knitted backing with a pile fiber face on one side, said filtering medium being capable of filtering dirt particles from high temperature air at a rate of about 60 to 80 cubic feet per minute per square foot of filter media at a pressure drop of less than 1.5 inch water gauge.

2. The improvement as recited in claim 1, wherein said pile of said fabric is 3 denier crimped fibers.

3. The improvement as recited in claim 2, wherein said pile is trimmed to a length of about 2 centimeters after knitting.

4. The improvement as recited in claim 3, wherein the total weight of said fabric is about 1.6 ounces per square foot with a ratio of 80% pile weight and 20% backing weight.

5. The improvement as recited in claim 4, wherein said fabric further comprises a high-temperature stabilizing agent which is applied to said fabric to retard stretching and shrinking.

6. A fabric filtering medium for continuous use at high temperatures, consisting essentially of an aromatic polyimide fiber which is rated for continuous use at temperatures up to about 500° F., spun into a denier yarn, with said yarn knitted into a backing, and said fibers being mechanically interlocked into said knitted backing to form a tufted pile capable of filtering dirt particles from high temperature air at a rate of about 60 to 80 feet per minute per square foot of filter media at a pressure drop of less than 1.5 inch water gauge.

7. A fabric as recited in claim 6, wherein said pile is 3 denier crimped fibers.

8. A fabric as recited in claim 7, wherein said pile is trimmed to a length of about 2 centimeters after knitting.

9. A fabric as recited in claim 8, wherein the total weight of said fabric is about 1.6 ounces per square foot with a ratio of 80% pile weight and 20% backing weight.

10. A fabric as recited in claim 9, wherein said fabric further comprises a high temperature stabilizing agent which is applied to said fabric to retard stretching and shrinking.

* * * * *